(12) United States Patent
Herlein et al.

(10) Patent No.: US 9,170,735 B2
(45) Date of Patent: Oct. 27, 2015

(54) METHOD AND SYSTEM FOR TOUCH SCREEN TEXT ENTRY

(75) Inventors: Gregory Charles Herlein, San Francisco, CA (US); Christopher Lewis Yunker, Portland, OR (US)

(73) Assignee: Thomson Licensings, Boulogne-Billancourt (FR)

( * ) Notice: Subject to any disclaimer, the term of this patent is extended or adjusted under 35 U.S.C. 154(b) by 0 days.

(21) Appl. No.: 13/138,062

(22) PCT Filed: Dec. 30, 2008

(86) PCT No.: PCT/US2008/014103
§ 371 (c)(1),
(2), (4) Date: Jun. 29, 2011

(87) PCT Pub. No.: WO2010/077224
PCT Pub. Date: Jul. 8, 2010

(65) Prior Publication Data
US 2011/0267273 A1     Nov. 3, 2011

(51) Int. Cl.
*G06F 3/0488* (2013.01)

(52) U.S. Cl.
CPC .... *G06F 3/04886* (2013.01); *G06F 2200/1614* (2013.01)

(58) Field of Classification Search
CPC .................................................. G06F 3/04886
See application file for complete search history.

(56) References Cited

U.S. PATENT DOCUMENTS

| 5,973,664 | A | 10/1999 | Badger |
| 6,567,101 | B1 * | 5/2003 | Thomas ........................ 345/649 |
| 6,816,893 | B2 * | 11/2004 | Boaz et al. ..................... 709/218 |
| 7,287,220 | B2 | 10/2007 | Kaasila et al. |
| 2002/0025852 | A1 | 2/2002 | Alcorn et al. |
| 2003/0069070 | A1 | 4/2003 | Alcorn et al. |
| 2003/0078840 | A1 | 4/2003 | Strunk et al. |
| 2004/0026136 | A1 | 2/2004 | Hill et al. |
| 2004/0049743 | A1 | 3/2004 | Bogward |
| 2004/0119852 | A1 | 6/2004 | Shin |
| 2004/0177323 | A1 | 9/2004 | Kaasila et al. |
| 2005/0020325 | A1 | 1/2005 | Enger et al. |
| 2008/0055272 | A1 | 3/2008 | Anzures et al. |
| 2008/0059888 | A1 | 3/2008 | Dunko |
| 2008/0165144 | A1 | 7/2008 | Forstall et al. |
| 2008/0165152 | A1 | 7/2008 | Forstall et al. |
| 2008/0211778 | A1 | 9/2008 | Ording et al. |
| 2011/0173569 | A1 * | 7/2011 | Howes et al. ................. 715/835 |

FOREIGN PATENT DOCUMENTS

| JP | 2003529161 | 9/2003 |
| WO | WO9948012 | 9/1999 |

OTHER PUBLICATIONS

Dimitry Khudorozhkov : "JavaScript Virtual Keyboard" Online, Mar. 30, 2008, XP002558421, URL:http:www.codeproject.com/KB/scripting/jvk.aspx.

Anonymous: "HTLM Forum: vertical text orientation.": Online, Nov. 18, 2005, XP002558619, URL:http://www.htmlforums.com/css/tt-vertical-text-orientation-66029.html.

Anonymous: "PHP Manual—imagegettftext." Online, May 19, 2005, XP0025558620, URL:http://theserverpages.com/php/manual/en/function.imagettftext.php.

Palmerlee, Matt: "Vertical Text in HTML—Creating vertical text images in webpages" Online, May 23, 2007, XP002558422, URL:http//www.codeproject.com/KR/aspnet/VerticalTextImage-Creation.aspx.

* cited by examiner

*Primary Examiner* — Jason Olson
(74) *Attorney, Agent, or Firm* — Robert D. Shedd; Vincent E. Duffy; Palak Bhakta (57) ABSTRACT

A method and system are disclosed for implementing touch screen text entry on a screen in a first orientation. A web page is used for presenting a touch screen display, which allows text selection via a virtual keyboard. Selected alphanumeric characters are displayed on the screen in an orientation matching the first orientation of the screen.

22 Claims, 5 Drawing Sheets

METHOD AND SYSTEM FOR TOUCH SCREEN TEXT ENTRY

This application claims the benefit, under 35 U.S.C. §365 of International Application PCT/US2008/014103 and filed Dec. 30, 2008, which was published in accordance with PCT Article 21(2) on Jul. 8, 2010, in English.

TECHNICAL FIELD

This invention relates to a method and system for implementing touch screen text entry.

BACKGROUND

Some digital signage venues need to be interactive to be effective, e.g., kiosk applications. User interactions may include text entries on a virtual keyboard, e.g., email addresses, or keywords for searching various items, among others. In certain situations, it is desirable to have the video display in portrait mode. However, there are technical issues associated with mounting digital signage screens in a portrait orientation.

For example, if the screen is mounted in a portrait orientation, digital content cannot be presented using web technology, because it is not possible for hypertext markup language (HTML) to write sideways (i.e., text display can only be presented in an upright orientation in landscape mode). Although some video cards are capable of rotating the entire video output to match a portrait screen orientation, the relatively high costs and poor full motion video support make them unsuitable for use in advertising venues.

BRIEF SUMMARY OF THE INVENTION

Embodiments of the present invention provide a method and system for implementing touch screen text entry on a screen provided in an orientation that is different from its primary orientation. Graphic images of alphanumeric characters are displayed in an orientation that matches the orientation of the screen.

One embodiment provides a method, which includes: providing a screen in a first orientation that is different from a primary orientation of the screen. The method further includes rendering a web page on the screen, the web page having a virtual keyboard, receiving touch data from the virtual keyboard for at least one alphanumeric character, and displaying the at least one alphanumeric character on the screen in a second orientation that matches the first orientation of the screen.

Another embodiment provides a method, which includes: providing a screen operable in at least one orientation, the at least one orientation including portrait orientation. The method further includes rendering a web page on the screen, the web page having a virtual keyboard, receiving touch data from the virtual keyboard for at least one alphanumeric character, and displaying the at least one alphanumeric character on the screen in an orientation that matches the at least one orientation of the screen.

Yet another embodiment provides a system, which includes: a screen operable in at least a first orientation that is different from a primary orientation of the screen, the screen configured for displaying a web page having a virtual keyboard for entering touch data corresponding to at least one alphanumeric character, and means for displaying the at least one alphanumeric character in a second orientation matching the at least one orientation of the display screen.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

To better understand embodiments of the present invention, a brief discussion of a display screen is presented with reference to FIGS. 1a-1d.

Figure 1A:
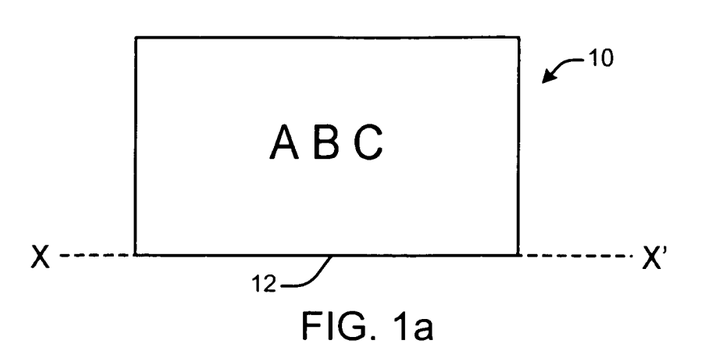
FIGS. 1a-1c illustrate a screen and text display in different screen orientations.

FIG. 1a is a schematic illustration of a screen 10 shown in a landscape orientation (i.e., vertical dimension being smaller than the horizontal dimension), which is a primary orientation for most computer screens in normal use today. As used herein, a primary orientation of a display screen or device refers to the orientation in which the direction of rendering of text and graphics (under normal applications and usage) matches, or is aligned with, the orientation of a screen. Video or text is rendered from a computer or playback device such that it appears correctly, or aligned properly, on a landscape oriented screen, e.g., appearing upright to a viewer, with X-X' being a horizontal axis in a viewer's reference frame. This is illustrated in FIG. 1a, in which an image "ABC" is properly aligned with the landscape orientation of screen 10. In this case, the bottom edge 12 of screen 10 is also parallel to the horizontal axis X-X'.

Figure 1B:
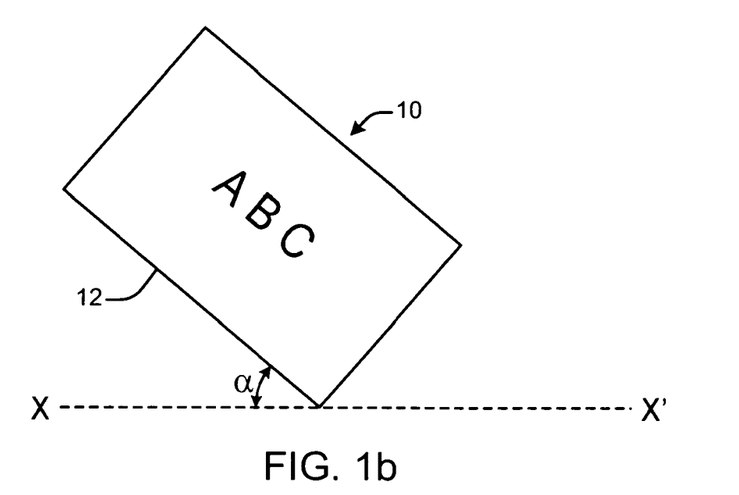

FIG. 1b illustrates the screen 10 being rotated at an angle away from the landscape orientation. In this example, screen 10 has been rotated in a clockwise direction by an angle α with respect to the horizontal axis X-X'. The image "ABC" also appears at an angle to the viewer, even though it remains aligned with respect to the screen's primary orientation or bottom edge 12 (as it should, in normal operation).

Embodiments of this invention provide a means for text entry that allows a rendered image corresponding to the entered text to be displayed so that it appears "normal" to a viewer, e.g., in an upright position to a viewer, regardless of the screen's orientation. This is achieved, for example, by displaying the image in an orientation that matches the orientation of the rotated screen.

Figure 1C:
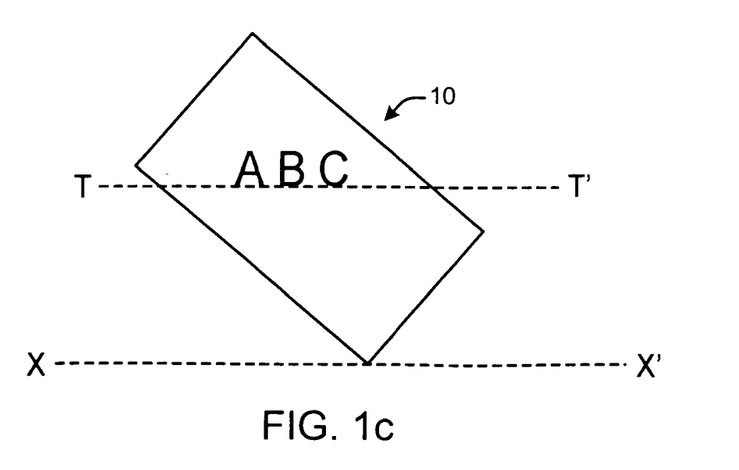

This is illustrated in FIG. 1c, showing the image "ABC" in a proper orientation for the viewer, and it is aligned with the horizontal axis X-X' (the longitudinal axis of text box "ABC" being parallel to X-X'). This can be achieved by rotating the image "ABC" to a proper orientation (similar to rotating the "ABC" in FIG. 1b in a counterclockwise direction by angle α). As discussed below, one aspect of the present invention provides for such an image rotation and subsequent rendering of the image on the screen.

Although for most applications, it is desirable to provide image rotation to match a viewer's frame of reference or to match the screen's orientation, the present invention can generally provide for any degree of rotation for the graphics and video to achieve a desired orientation.

Figure 1D:
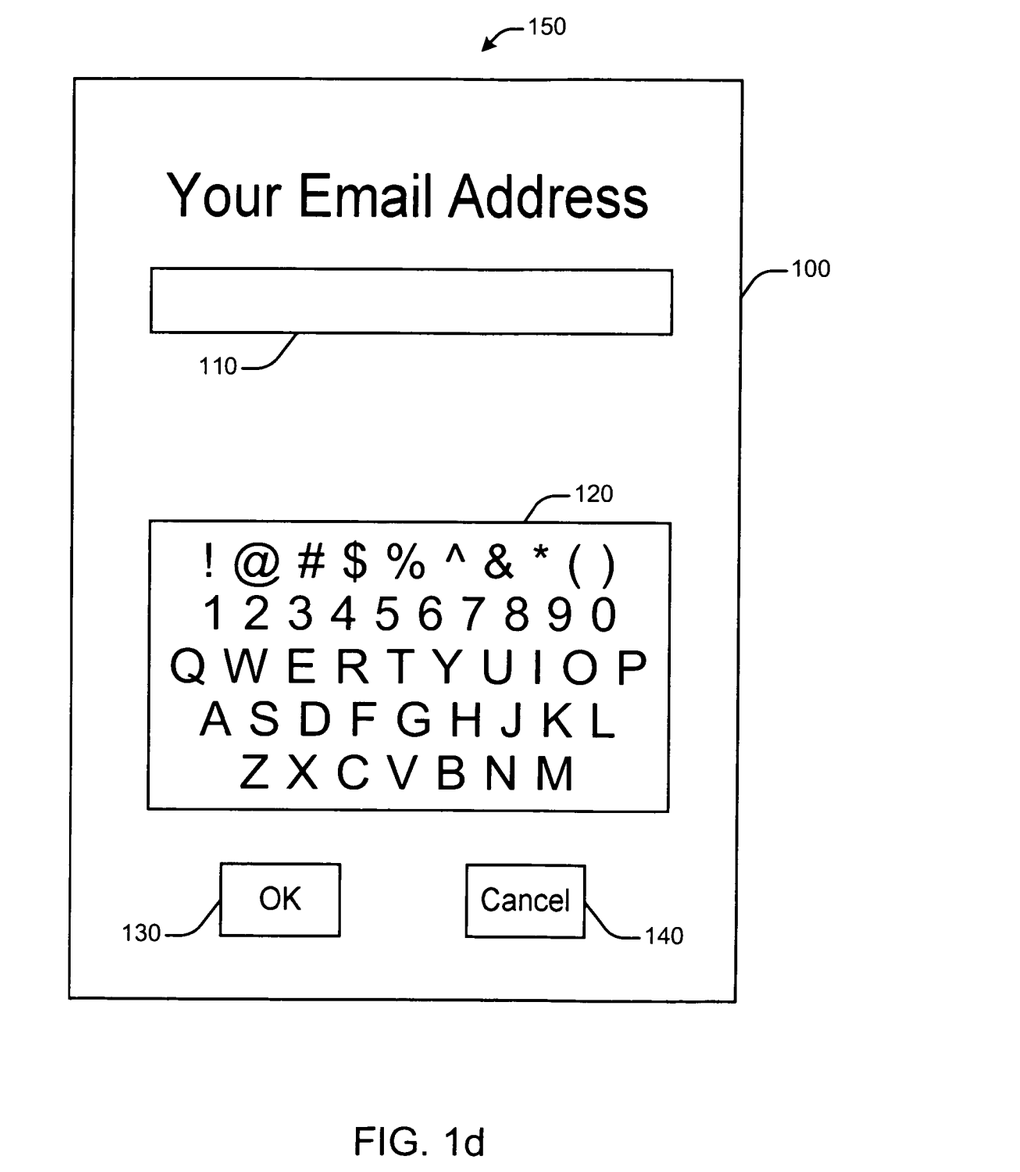
FIG. 1d illustrates a display for text entry on a screen in one orientation according to one embodiment of the present invention.

FIG. 1d is an illustration of a screen 100 provided in a portrait orientation, with the vertical dimension of the screen 100 being larger than the horizontal dimension. This orientation is different from a primary orientation of a typical display screen in use today.

Embodiments of the present invention provide a screen display 150 for text entry so that the resulting text will have an orientation that is consistent with, or matches, the screen's orientation, even though it is different from its primary orientation. For example, for a screen mounted in portrait mode, the text will appear upright.

In one embodiment, the text entry display 150 is presented using web technology, e.g., as a part of a web page. In this example, a user's email address is to be entered in a text entry area 110, which appears blank prior to any text entry, as shown in FIG. 1. The text entry display 150 also shows graphics of a virtual keyboard 120, along with various function keys such as an acknowledgement ('OK') key 130 and a 'cancel' key 140. Other function or instruction keys (not shown) can also be provided.

Images of alphanumeric characters, e.g., alphabets, numbers, punctuation marks and other symbols, are displayed on the virtual keyboard 120 for selection by a user. Individual graphic images (for example, PNG, JPEG, GIF or others) of each character on the keyboard 120 are loaded into the web page upon page load for later use, e.g., insertion to the text entry area 110 upon receiving touch data from the keyboard 120. These graphic images, though loaded into the page, are not displayed, and thus, are invisible on the screen 100. In one embodiment of this invention, these images are stored as files on a local hard drive. In another embodiment, they are stored on a local RAM disk in the set top box. Prior to being rendered in the web browser, these graphic images are rotated in the correct orientation (e.g., consistent with or matching the screen's orientation) so that, when displayed on screen 100, they will appear normal, i.e., in an upright orientation as opposed to being sideways.

Figure 2:
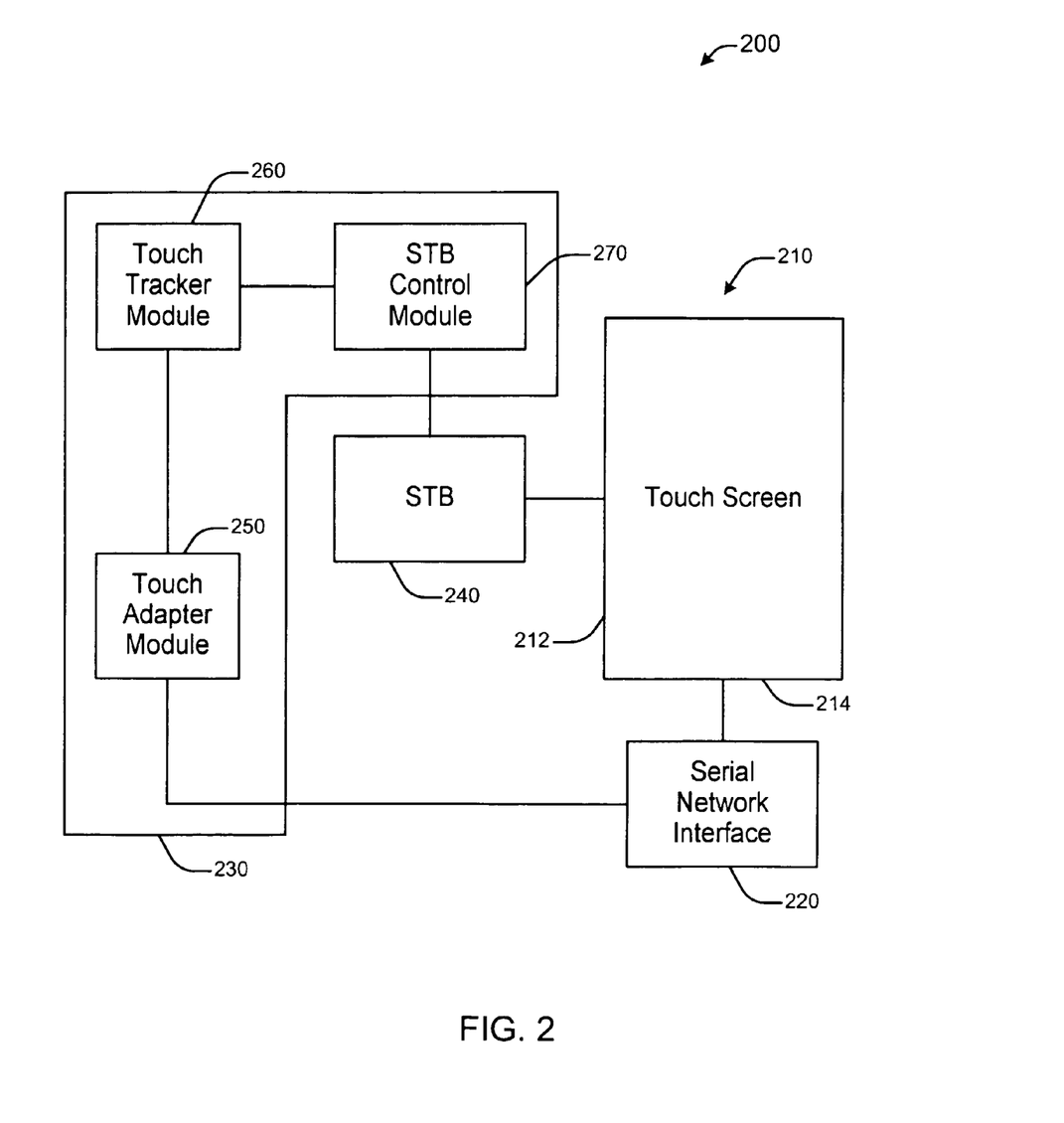
FIG. 2 illustrates a system for implementing embodiments of the present invention.

FIG. 2 is a schematic diagram of a text entry system 200 for implementing touch screen text entry according to the present principles. The system 200 includes hardware components such as a touch screen 210, a serial network interface 220, a server 230 and a set-top box (STB) 240. As used herein, the STB 240 is a device that converts a video input signal into content for display on a screen. The serial network interface 220 includes hardware components, such as serial ports, network interface and a processor with associated software for data processing. The STB 240 is coupled to a STB control module 270 and to a display screen with an overlaid touch screen 210. In this example, software components such as a touch adapter module 250, a touch tracker module 260 and the STB control module 270 are installed on the server 230. Alternatively, the STB control module 270 may also reside on the STB 240. In one embodiment, the display/touch screen 210, server 230, STB 240, and associated software modules, are components of an in-store video advertising system, which allows users to interact with the system, e.g., request information, provides instructions, and so on, via data entry at the touch screen 210.

A user interacting with the text entry system 200 can select a character by touching the appropriate region on the display screen 210, e.g., a specific alphanumeric character in keyboard 120 in FIG. 1. Each touch selection generates a corresponding location data, e.g., x- and y-coordinates representing the touched location. In this example, the touch screen 210 is mounted in a portrait orientation (i.e., different from the conventional landscape, orientation), the long edge 212 of the screen, or vertical edge, is interpreted by the touch screen controller (not shown) as the x-axis, and the short edge 214, or horizontal edge, is interpreted as the y-axis.

The x and y coordinate data from the touch screen 210 are sent as RS-232 or USB serial data to the serial network interface (SNI) 220. In one embodiment, the SNI 220 transforms the x-y coordinate touch data by interchanging the x- and y-coordinates. That is, the x-coordinate data is transposed with the y-coordinate data, so that the y-axis data now lies in the vertical direction (long edge 212), and the x-axis data now lies in the horizontal direction (short edge 214). This transformation also allows programming of the media and interactivity to be done using a coordinate system that is consistent with common practice. The transposed x and y coordinate data is then sent over a network, e.g., Ethernet, to the touch adapter module 220.

The transposed x-y coordinate data from the touch screen is further translated by the touch adapter 250 into the coordinate system of the video display screen, including, for example, mapping the touch screen resolutions to those of the video display screen. As an example, if the touch screen has a resolution of 1000×1000 'units' (x- and y-coordinates), and the video resolution is 1920×1200 pixels, the touch adapter 250 would translate the area defined by the touch coordinate data into corresponding video coordinates on the screen.

In another embodiment, the transformation or transposing of the x-y coordinate data is done by the touch adapter 250, and not by the SNI 220. Thus, x-y coordinate touch data is sent by the SNI 220 to the touch adapter 250, which then transposes the x- and y-coordinate data (as described above for SNI 220), and translates the data into the video coordinate of the display screen.

Data that has been processed by the touch adapter module 250 is then sent to the touch tracker module 260, which may cache the data in a buffer for access by the STB control module 270. In one embodiment, the asynchronous data originating from the touch screen 210 is cached until software running in a web browser in the STB 240 polls to see if touch data is available. The web page rendered into the browser executes JavaScript to poll the touch tracker 260 for touch data. The STB control module 270 also controls how media is rendered on the video display screen.

Figure 3:
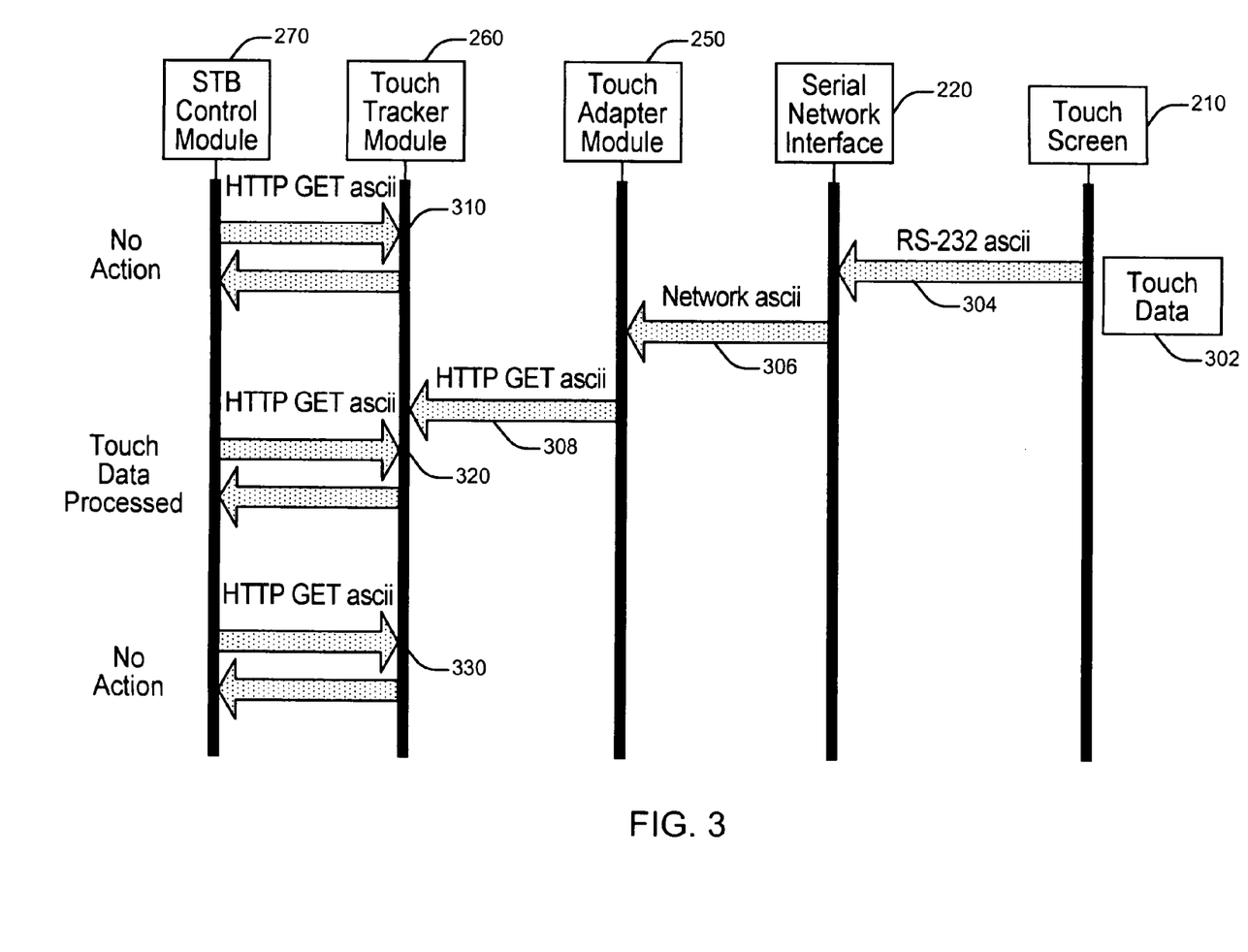
FIG. 3 illustrates data flow in accordance with one embodiment of the present invention.

FIG. 3 is a schematic diagram illustrating data flow among these components of system 200. Touch data from the touch screen 210 flows uni-directionally, through the serial network interface 220 and touch adapter module 250, to the touch tracker module 260 that holds the data. The STB control module 270 (which might be physically executing on a server or on the STB 240) polls the touch tracker module 260 for touch data, e.g., by issuing a HTTP GET command. Data is sent from the touch screen to the touch tracker, regardless of whether there is polling by the STB control module.

In the example of FIG. 3, during poll events 310 and 330, there is no data at touch tracker 260, so no action is taken by the STB control module 270 after polling.

In the poll event 320, touch data 302 received at touch screen 210 has been processed by intermediate components such as the serial network interface 220 and the touch adapter 250, shown as data 304, 306 and 308 in ASCII format (American Standard Code for Information Interchange), e.g., one byte of ASCII per touch, and transmitted to the touch tracker 260. In response to polling by the STB control module 270, the touch tracker 260 forwards the available data for further processing.

In one implementation of the STB control module 270, a JavaScript is running in a browser on the STB 240, and a Javascript application programming interface (API) such as a XMLHttpRequest API (XML stands for "extended markup language" and Http stands for "hypertext transfer protocol") can be used by the JavaScript to poll periodically for touch data, e.g., via the STB control module 250, as shown in FIG. 3. A polling rate of 5 times per second is expected to result in sufficient response times for most applications, although different polling rates may also be used to suit other needs.

If the Javascript code running in the browser successfully retrieves data from the STB control module, then the Javascript software would use Document Object Model (DOM) functions that would result in a graphical form of the character being displayed at a current cursor position in the text entry area 110. Note that this text display is not being done by conventional HTML text entry. Instead, the graphic image of the character (previously loaded on the web page at page load), is inserted into the text entry area 110.

Figure 4:
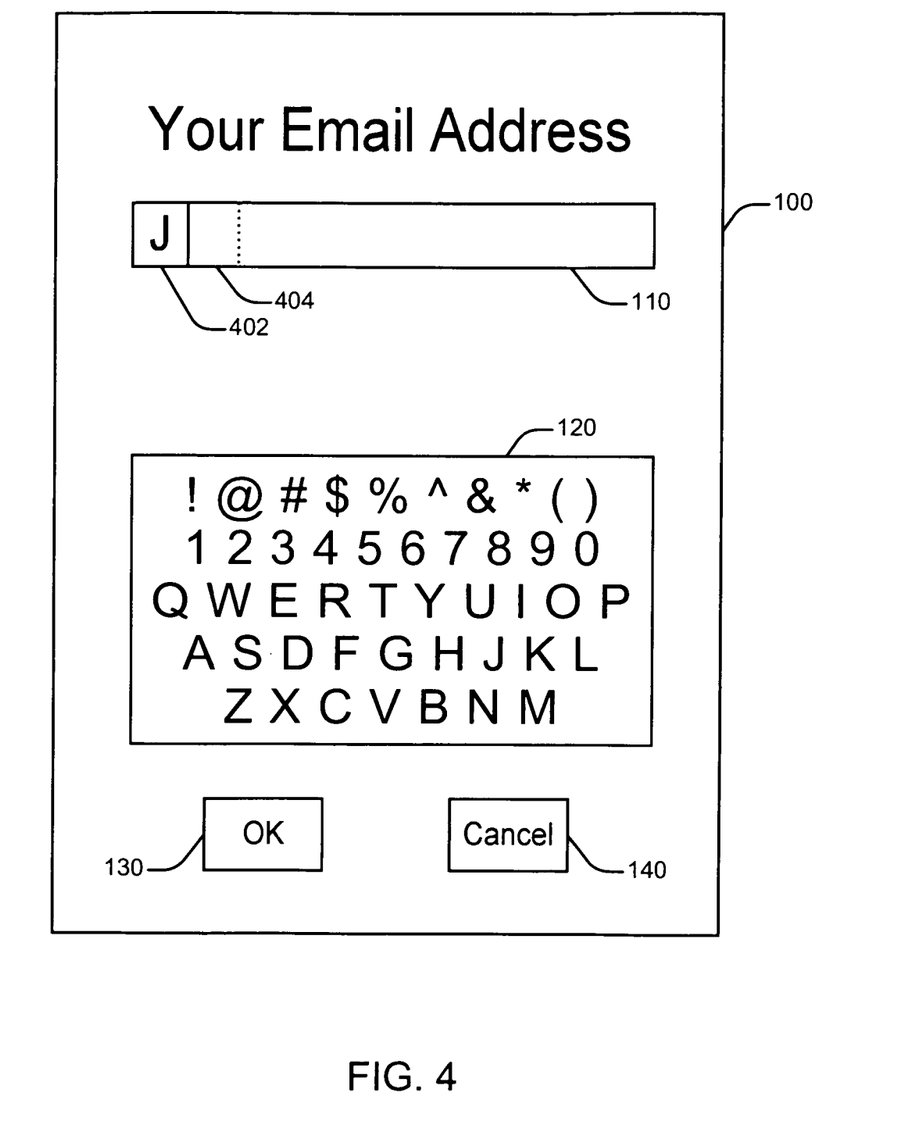
FIG. 4 illustrates text entry according to one embodiment of the present invention.

This is further illustrated in FIG. 4, which shows text entry on the screen 100, which is mounted in an orientation different from what the screen is designed for. Embodiments of the invention provide that the entered text is displayed in an orientation matching the screen's orientation, e.g., text being displayed in an upright position with the screen 100 in a portrait mode. Prior to any data selection at the virtual keyboard 120, a visible or invisible cursor marks the beginning text position 402 of the text entry area 110, which corresponds to a 'blank' image (similar to FIG. 1). When a user selects an alphanumeric character by touching a corresponding region of the virtual keyboard 120, touch events are generated to signal the selected alphanumeric character.

As discussed above, the touch data results in the appropriate text being available for retrieval by the Javascript software. The Javascript software makes the XHTTPRequest to obtain that text data and then executes a Document Object Model (DOM) function, which changes the image at the cursor location in the text area 110 from a 'blank' image to a graphic that matches the selected alphanumeric character. Thus, if the first touch data is the letter "J" on the keyboard 120, corresponding data will be provided (as illustrated in FIG. 3) to the STB 260, resulting in the display of the letter "J" in the first character position 402 in the text entry area 110, as shown in FIG. 4. In this example, the graphic image is displayed by manipulating the HTML Document Object Model (DOM) to display the selected graphic of the letter without requiring the entire web page to be re-drawn.

After a selected alphanumeric character has appeared in the text entry area 110, the cursor is advanced to the next position 404, e.g., to the right of cursor position 402, for additional text entry. In other embodiments, a 'backspace' or 'delete' key (not shown) can also be provided on the touch screen 100, which, when selected, can cause the image in the previous cursor position (e.g., to the left of the current cursor location) to be replaced by a 'blank' image while moving the cursor back by one position.

In one embodiment, these image replacements are handled using DOM dynamic HTML manipulations in JavaScript. To achieve nearly instant display, these images of the alphanumeric characters (also referred to as "character images") can be loaded onto the local processor, e.g., on the server or STB, and served from a web server process running on that processor. For example, in one implementation, a web server process can be run on the STB 240 with the character images mapped into its file system. Serving these files directly from the STB (as opposed to fetching over a network) can significantly reduce the latency between touch data selection and corresponding display in the text entry area, thus improving the system responsiveness and user experience.

As additional alphanumeric characters are selected on the touch screen, the touch data are processed so that corresponding graphic for the selected characters are generated at the proper positions in the text entry area 110.

In another embodiment, a local area network is not used. Instead, all modules would run on the set top box. The web page would include JavaScript that uses the XHTTPRequest function call to make many requests per second to a Key Stroke Manager URL to collect key strokes. Since the Key Stroke Manager is running on the local processor, this creates zero network traffic and is highly responsive. Each key stroke would be processed as described above (in connection with FIGS. 2-4) resulting in the display of the selected text characters.

In one implementation, the touch screen key stroke data can be communicated using the Device Group Control Protocol (DGCP), which is an extremely efficient network protocol that supports communications to a plurality of devices in groups. Implementations that use DGCP would operate the same logical way but might have a plurality of devices listening to the touch screen data. This might make remote touch logging more efficient, for example, by allowing an independent software module to log touch screen data without disturbing the actual touch screen application. Details of the protocol are described in a published PCT patent application, WO 2008/123858 A1, "Device Group Control" filed on Jun. 13, 2007, and herein incorporated by reference in its entirety.

Aside from a retail advertising system, embodiments discussed above can generally be applied to video display systems in many different venues or environments that would benefit from applications that require text entry on a display screen in an orientation different from the one that the screen is designed for. It is understood that, even though the examples in FIG. 1 and FIG. 4 relate to text entry on a screen in portrait mode, the present principles are also applicable to other orientations of the screen that are different from the screen's "normal" orientation (which the screen is designed for), e.g., landscape mode.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method, comprising:
providing a screen having a horizontal axis that is parallel to a least one edge of the screen and a vertical axis that is perpendicular to the horizontal axis and parallel to at least one other edge of the screen;
rendering a web page on the screen such that content associated with the web page is provided in a first orientation that is parallel to one of the horizontal axis and the vertical axis, the web page having a virtual keyboard;
receiving touch data from the virtual keyboard for at least one alphanumeric character; and
displaying the at least one alphanumeric character on the screen in a second orientation that is parallel to a reference axis, wherein the reference axis forms an acute angle with respect to the horizontal axis and an acute angle with respect to the vertical axis.

2. The method of claim 1, wherein the at least one alphanumeric character is displayed on the screen as a graphic image of the alphanumeric character.

3. The method of claim 1, further comprising:
representing the touch data by a first coordinate and a second coordinate;
transforming the touch data by transposing the first coordinate and the second coordinate; and
transmitting the transformed data to a server as serial data over a network.

4. The method of claim 3, wherein the network is an Ethernet.

5. The method of claim 3, further comprising:
running a web browser on a set-top box connected to the screen; and
polling the server for data using the web browser.

6. The method of claim 5, further comprising:
providing the transformed data to the set-top box; and
displaying a graphic image of the at least one alphanumeric character on the screen by refreshing only a portion of the web page occupied by the graphic image.

7. The method of claim 3, further comprising:
in response to polling by a set-top box connected to the screen, providing the transformed data from the server to the set-top box; and
displaying the at least one alphanumeric character on the screen using hypertext markup language document object model (HTML DOM).

8. A method, comprising:
providing a screen operable in at least one orientation;
rendering a web page on the screen, the web page having a virtual keyboard; wherein the rendering of the web page further comprises:
loading on the web page graphic images of all alphanumeric characters shown on the virtual keyboard, the graphic images having orientations that match the screen orientation; and
displaying the virtual keyboard;
receiving touch data from the virtual keyboard for at least one alphanumeric character; and
displaying the at least one alphanumeric character in a text entry area of the screen in an orientation that is parallel to a reference axis,
wherein the orientation of the reference axis is independent of the at least one orientation.

9. The method of claim 8, wherein the at least one alphanumeric character is displayed on the screen as a graphic image of the alphanumeric character.

10. The method of claim 8, further comprising:
representing the touch data by a first coordinate and a second coordinate;
transforming the touch data by transposing the first coordinate and the second coordinate; and
transmitting the transformed data to a server as serial data over a network.

11. The method of claim 10, further comprising:
providing the transformed data to a set-top box connected to the screen; and
displaying a graphic image of the at least one alphanumeric character on the screen by refreshing only a portion of the web page occupied by the graphic image.

12. A system, comprising:
a screen having a horizontal axis that is parallel to a least one edge of the screen and a vertical axis that is perpendicular to the horizontal axis and parallel to at least one other edge of the screen, the screen configured for displaying a web page having a virtual keyboard for entering touch data corresponding to at least one alphanumeric character; rendering a web page on the screen such that content associated with the web page is provided in a first orientation that is parallel to one of the horizontal axis and the vertical axis, the web page having a virtual keyboard;
and
a control module that displays the at least one alphanumeric character in a second orientation that is parallel to a reference axis, wherein the reference axis forms an acute angle with respect to the horizontal axis and an acute angle with respect to the vertical axis.

13. The system of claim 12, wherein the first orientation is a portrait orientation.

14. The system of claim 12, further comprising:
a serial network interface that processes the touch data; and
a server for receiving the processed touch data.

15. The system of claim 14, wherein the touch data is represented by a first coordinate and a second coordinate, and the serial network interface further processes the touch data by transposing the first coordinate and the second coordinate.

16. The system of claim 15, further comprising:
a set-top box connected to the screen, wherein the set-top box displays the at least one alphanumeric character on the screen based on data received from the server.

17. The system of claim 16, wherein the set-top box further displays a graphic image of the at least one alphanumeric character on the screen by refreshing only a portion of the web page corresponding to a display location of the at least one alphanumeric character.

18. The system of claim 13, wherein the means for displaying the at least one alphanumeric character includes:
a network interface that processes the touch data; and
a server that transforms the processed touch data into a data format to display the at least one alphanumeric character on the screen.

19. A system, comprising:
a screen operable in at least one orientation;
a control module that:
renders a web page on the screen, the web page having a virtual keyboard:
loads on the web page graphic images of all alphanumeric characters shown on the virtual keyboard, the graphic images having orientations that match the screen orientation; and
displays the virtual keyboard;
a touch tracker module that receives touch data from the virtual keyboard for at least one alphanumeric character; and
a control module that displays the at least one alphanumeric character in a text entry area of the screen in an orientation that is parallel to a reference axis, wherein the orientation of the reference axis is independent of the at least one orientation.

20. The system of claim 19, wherein the at least one alphanumeric character is displayed on the screen as a graphic image of the alphanumeric character.

21. The system of claim 19, further comprising:
an interface that represents the touch data by a first coordinate and a second coordinate;
a touch adapter module that transforms the touch data by transposing the first coordinate and the second coordinate; and
a serial network interface that transmits the transformed data to a server as serial data over a network.

22. The system of claim 21, wherein the control module further:

provides the transformed data to a set-top box connected to the screen; and displays a graphic image of the at least one alphanumeric character on the screen by refreshing only a portion of the web page occupied by the graphic image.

\* \* \* \* \*